United States Patent [19]
Gimmler et al.

[11] Patent Number: 5,925,387
[45] Date of Patent: Jul. 20, 1999

[54] APPLICATION OF WAX COATED INORGANIC PARTICLES TO THE SURFACE OF CHEWING GUM

[75] Inventors: Norbert Gimmler, Ringwood; Thomas Carroll, Oak Ridge, both of N.J.

[73] Assignee: Nabisco, Inc., Parsippany, N.J.

[21] Appl. No.: 09/022,913

[22] Filed: Feb. 12, 1998

[51] Int. Cl.⁶ ........................................................ A23G 3/30

[52] U.S. Cl. .................................................. 426/5; 426/97

[58] Field of Search ............................... 426/3, 5, 96, 99, 426/97

[56] References Cited

U.S. PATENT DOCUMENTS

| | | | |
|---|---|---|---|
| 4,374,858 | 2/1983 | Glass et al. | 426/5 |
| 4,656,039 | 4/1987 | Weiss et al. | 426/5 |
| 4,867,989 | 9/1989 | Silva et al. | 426/5 |
| 4,885,175 | 12/1989 | Zibell | 426/5 |
| 4,976,972 | 12/1990 | Patel et al. | 426/3 |
| 4,981,698 | 1/1991 | Cherukuri et al. | 426/5 |
| 5,145,696 | 9/1992 | Patel et al. | 426/5 |
| 5,286,502 | 2/1994 | Meyers | 426/5 |

*Primary Examiner*—Arthur L. Corbin
*Attorney, Agent, or Firm*—Scully, Scott, Murphy & Presser

[57] ABSTRACT

Chewing gum bearing on its outer surface a powder of inert inorganic material, such as calcium carbonate, that is coated with edible wax.

20 Claims, No Drawings

APPLICATION OF WAX COATED INORGANIC PARTICLES TO THE SURFACE OF CHEWING GUM

FIELD OF THE INVENTION

The present invention relates to chewing gum and more particularly to chewing gum in stick form and bearing a dusting of a novel rolling powder.

BACKGROUND OF THE INVENTION

Chewing gum is a mixture of one or more polymeric materials, usually blended with one or more additional ingredients such as bulking agents, plasticizers, sweeteners and/or flavorants. The physical properties that make these components effective in a chewing gum also contribute to the difficulty of manufacturing and packaging the chewing gum. For instance, the polymeric material is often sticky, particularly at the temperatures above ambient to which the material is heated during mixing of the various ingredients. The gum is still quite sticky during rolling of the gum bulk into flat sheets from which the well known sticks are manufactured. Ingredients used as bulking agents, plasticizers, flavorants and/or sweeteners are often sticky as well. Furthermore, many of such ingredients are hygroscopic, that is, they exhibit a tendency to absorb water vapor from the atmosphere which in turn adds to the stickiness of the chewing gum during its manufacture and packaging.

It is known to employ powder, sometimes known as dusting powder or rolling powder, to attempt to alleviate the drawbacks caused by the stickiness of the chewing gum during its manufacture and packaging. That is, after the various components are heated and mixed together, the mass of gum is fed through an extruder, which forms it into a continuous sheet. The rolling powder is then deposited on the planar surfaces of this flat sheet before it is fed through a rolling machine, which reduces the thickness of the gum sheet to that of the finished sticks.

The rolling powder inhibits adhesion of the chewing gum to rollers and other equipment with which it comes into contact, which is very useful in that during commercial manufacturing operations the sheet is moving through the associated machinery at many dozens of feet per second. In addition, the rolling powder inhibits adhesion of the gum to the machinery which subsequently cuts the gum into sticks and packages it, and also inhibits adhesion of the gum to the wrapper with which the gum would otherwise come into contact.

Examples of rolling powders and their use are disclosed in, for instance, U.S. Pat. No. 4,208,432; U.S. Pat. No. 5,145,696; U.S. Pat. No. 4,374,858; and U.S. Pat. No. 4,976,972.

Rolling powders, however, can also contribute a number of drawbacks. Principal among these is the effect of the rolling powder on the taste of the final chewing gum product. Another drawback is the effect on the mouth feel of the gum when it is chewed, particularly if the rolling powder makes the gum feel dry or gritty in the mouth. In addition, rolling powders can accumulate in the processing machinery if it is not sufficiently adherent to the surface of the chewing gum. Moreover, the rolling powder represents an additional ingredient of the gum and as such can raise the cost of manufacture to unacceptable levels if the component or components used in the rolling powder are too expensive or must be used in large quantities.

Thus, there remains a need for rolling powders useful in the manufacture of chewing gum, which avoid these drawbacks and which provide a finished chewing gum product wherein the rolling powder does not adversely affect the taste, mouth feel, or processing properties of the gum.

BRIEF SUMMARY OF THE INVENTION

These and other advantages are provided by the invention described herein. One aspect of the present invention is chewing gum bearing on its outer surface powder comprising an inert inorganic particulate filler, such as calcium carbonate, that is coated with wax. Calcium carbonate has been proposed in the past as a candidate rolling compound. However, despite the abundance and low cost of this material, it can be considered relatively unattractive in that it contributes a gritty texture to the gum upon chewing thereof, and detracts from the overall taste and flavor of the gum. Application of the coating to the particulate material overcomes the textural and flavor disadvantages of the particulate material.

Another aspect of the present invention is a method for manufacturing chewing gum wherein the gum components are combined and rolled into a flat sheet, and a rolling compound is applied to the sheet, wherein the rolling compound comprises inert inorganic particulate material that is coated with wax. Applying the wax-coated particulate filler to the gum surface reduces the adhesivity, that is, the tendency of the gum to adhere to surfaces it contacts, and retards the passage of moisture from the gum to the atmosphere and from the atmosphere to the gum.

DETAILED DESCRIPTION OF THE INVENTION

The powder which is employed in association with the present invention comprises finely divided particles which are coated with wax. By "coated" is meant that the particles are encased in a layer of wax which is either continuous around the entire particle or is at least sufficiently encasing that the particle itself cannot be detected upon chewing of the chewing gum.

This powder can be conveniently manufactured in conventional processing equipment, generally by melting the wax and mixing it with the particles of calcium carbonate or other material, and finally letting the combination cool. Although coating can be achieved by any of the methods known in the art, such as intimately stirring the particles of inorganic material into the molten wax and finally letting the combination cool or such as dissolving the wax or fatty acid in an organic solvent and then stirring the particulate inorganic material into the solution, separating the soaked particles from any excess solution, evaporating the solvent and finally letting cool the remainder, it is preferred to simultaneously melt the wax and mix it with the inorganic particles and finally let the combination cool. The coating can conveniently be carried out in machinery which simultaneously melts the wax and atomizes the mixture of wax and inorganic particulates.

In preferred embodiments, the starting wax and inorganic particulates may be continuously conveyed into a high speed continuous mixer/heater exchanger such as a "Turbulizer", which is produced by Hosokawa Bepex Corporation, Minneapolis, Minn. The rotary shaft of the Turbulizer is equipped with paddles, which atomize the mixture and convey it through the reaction chamber of the machine. The jacketed barrel and the rotary shaft may be heated by steam or an oilbased heating medium. The temperature applied to the jacket and the rotary shaft is typically above the melting temperature of the wax, so that the wax quickly and completely melts as it comes in contact with the hot surface of the Turbulizer. The inorganic particulates then pick up the melted wax as it is atomized by the rotation of the rotary shaft. The rotary shaft typically rotates at 3000–4000 rpm. It is important that the flow rate with which the wax and the inorganic particulates is metered into the Turbulizer allow a long enough residence time of the mixture in the Turbulizer that the wax completely melts and evenly moistens the surface of the particles before the mixture is discharged. A typical residence time is between about 10 and 20 seconds when the temperature of the jacket and the rotary shaft of the Turbulizer is about 130–200° F. above the melting temperature of the wax. Lower temperature differences require a longer residence time. After discharge from the Turbulizer, the wax/particulate mixture is allowed to cool below the crystallization temperature of the wax. The cooling of the mixture can be carried out conveniently by pneumatically conveying the mixture from the Turbulizer discharge to a separation cyclone or a filterbag house, where the mixture is separated from the air stream. The carrier air may be chilled prior to entering the pneumatic conveying system in order to speed up the cooling process.

The inert inorganic particulate material used to produce the wax-coated powder preferably has a particle size of 30 microns or less. The wax-coated particles should have a particle size of about 50 microns or less.

The inert inorganic particulate material is preferably calcium carbonate. Other useful materials include talc and any edible sugar.

The waxes which are useful in this invention include hydrocarbons, typically paraffinic, including mixtures of medium chain length hydrocarbons, which are solid at room temperature and are edible. Preferred examples include carnauba wax, paraffin and microcrystalline wax. The melting point of the wax should be higher then the temperature at which the gum is processed.

The amount of the wax present in the rolling powder generally comprises 0.05 wt. % to 5 wt. % of the combined weight of wax and inorganic particulate material. More preferably, the wax constitutes 1 wt. % to 3 wt. % of that powder. This represents a significant and unexpected advantage of the invention, in that a relatively minor amount of wax is sufficient such that despite the relatively higher cost of the wax compared to the cost of the inorganic particulate material, an effective rolling compound is formed which affords the many advantages described herein.

The resulting wax-coated powder is applied to the extruded sheet of the chewing gum, in any conventional manner at the point before the sheet is rolled during conventional processing and manufacturing of chewing gum. The rolling powder adheres to the surface of the gum, but does not form an impervious film. The amount of the powder to apply to the chewing gum should be sufficient to reduce or eliminate adhesion of the chewing gum itself to the rolling machinery. Typical effective amounts of the powder comprise 0.1 wt. % to 5 wt. % powder based on the weight of the gum, and more preferably 1 wt. % to 3 wt. % based on the weight of the gum. Any excess powder which does not adhere to the gum may be collected and recycled for application to more gum.

Optionally, other functional components can be incorporated into the wax, such as colorants, flavorants, and/or sweetening agents.

The invention is useful with respect to chewing gums in all forms whether sugar-containing or sugar-free, bubble gum or conventional chewing gum, and the like. The chewing gum of the present invention comprises the gum base itself, optional solvents and/or plasticizers, as well as optional flavorants, sweeteners, or both. The amount of gum base employed will vary greatly depending on various factors such as the type of base used, consistency desired and other components used to make the final product. In general, amounts of gum base of about 5% to about 50% by weight of the chewing gum composition are acceptable for use in the chewing gum compositions, preferred amounts thereof being about 15% to about 25% by weight.

The gum base may be any water-insoluble gum base including those well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene and polyvinyl acetate, and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins, or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester or rosin, such as polymers of alpha-pinene; terpene resins including polyterpene; and mixtures thereof. The solvent may be employed in an amount ranging from about 10% to about 75% and preferably about 45% to about 70% by weight to the gum base.

The gum base can also contain any of a variety of traditional ingredients such as plasticizers or softeners such as lanolin, stearic acid, sodium stearate, potassium stearate, glycerol triacetate, glycerine and the like and/or waxes, for example, natural waxes, paraffin waxes and microcrystalline waxes, to obtain a variety of desirable textures and consistency properties. These individual additional materials are generally employed in amounts of up to about 30% by weight and preferably in amounts of from 3% to about 20% by weight of the final gum base composition.

The chewing gum composition may additionally include conventional additives such as emulsifiers such as lecithin and glycerol monostearate; and additional fillers such as aluminum hydroxide, magnesium hydroxide, alumina, aluminum silicates, calcium carbonate, and talc and combinations thereof. These fillers may be used in the gum base in various amounts. Preferably the amount of fillers when used will vary from about 4 to about 30% by weight of the final chewing gum.

The chewing gums of this invention can also contain a flavoring component. Suitable flavorants include both natural and artificial flavors and mints, such as oil of peppermint, menthol, oil of spearmint, vanilla, oil of cinnamon, oil of wintergreen (methyl salicylate), and various fruit flavors, including but not limited to lemon oil, orange oil, grape flavor, lime oil, grapefruit oil, apple, apricot essence, and combinations thereof. The flavorings are generally utilized in amounts that will vary depending upon the individual flavor. Optionally, a small amount of a vegetable oil or equivalent material can be added to the flavor oil when it is desired to lessen any overly strong impact of the flavor.

The flavoring component of the gums of the present invention preferably comprises about 0.005% to about 3.0% by weight of the final chewing gum product.

The present invention contemplates the optional inclusion in the chewing gum of a sweetener component which comprises any of one or more sweeteners known in the art, including both natural and artificial sweeteners. Thus, sweeteners may be chosen from the following non-limiting list, which includes sugars such as sucrose, glucose, corn syrup, dextrose, invert sugar, fructose and mixtures thereof; saccharine and its various salts such as the sodium or calcium salt; cyclamic acid and its various salts such as the sodium salt; free aspartase; dihydrochalcone sweetening compounds; glycyrrhizin; Stevia rebaudiana (Stevioside); monellin, thalmatin, Sucralose, neosugar, and polydextrose; and sugar alcohols such as sorbitol, sorbitol syrup, mannitol, xylitol, isomaltitol, lactitol, maltitol, and the like. Also contemplated as a sweetener is the nonfermentable sugar substitute hydrogenated starch hydrolysate (also known as Lycasin) which is described in U.S. Pat. No. Re. 26,959. Also contemplated is the synthetic sweetener, 3,6-dihydro-6-methyl-1-1,2,3,-oxathiazin-4-one-2,2-dioxide, particularly the potassium (Acesulfame-K), sodium and calcium salts thereof as described in German Patent No. 2,001,017.7.

As indicated, products within the scope of the present invention may include no sweetener at all. If sweetener is included, the amount of sweetener is effective to provide the desired degree of sweetness, generally 0.0001 to 70 wt. % of the final product.

Colorants can be present in the chewing gums of the present invention. Examples include the pigments such as titanium dioxide and other dyes suitable for food, drug and cosmetic applications known as F.D. & C. dyes, and the like. The materials may be incorporated in amounts of up to about 6% by weight, preferably under about 1% by weight.

Chewing gums in accordance with the present invention are formulated in accordance with essentially conventional processing technology. Thus, preferably, the gum base including any resins, plasticizers, fillers and/or other gum base components are softened together by heating and then mixed together with any sweetening and/or flavoring component, and the mixture is stirred together for a time sufficient to insure a homogeneous mass. The mass can be formed into slabs from which individual stick-type pieces are formed using technology familiar to those skilled in this art.

The present invention affords numerous advantages, both in the manufacture of the gum and in the properties of the final gum product. The wax-coated powder has been shown to be an effective agent in preventing adhesion of the chewing gum to the rolls and other processing machinery. In addition, this rolling powder appears to prevent other dusting agents from adhering to machinery (such as mannitol or other agents which are used as lubricating agents in the wrapping station in which individual sticks are wrapped in their wrappers). The rolling powder of the present invention also facilitates the wrapping operation itself.

This rolling powder also retards or prevents absorption of atmospheric humidity into the gum and loss of desired moisture into the atmosphere. This discovery, in turn, affords additional time and flexibility to the operator, in that the necessity to wrap the freshly cut sticks of gum promptly in their wrappers is reduced. That is, the gum can remain unwrapped for a longer period of time without concern that it will absorb or lose excessive amounts of moisture to or from the ambient atmosphere.

The chewing gum itself, bearing the layer of the wax-coated rolling powder, has been found to exhibit wholly satisfactory taste and mouth feel, without any deleterious effect of the wax-coated particulate material nor of the particulate material itself. Thus, the present invention affords a discovery that provides the processing and product advantages of a rolling powder without any of the defiencies conventionally associated with rolling powder. In addition, these advantages are afforded with a rolling powder that after application to the gum is in the form of discrete particles of coated powder, rather than a film or layer of wax. Thus, even without having to employ such an amount of wax that would form a continuous, impervious film or layer of wax, the advantages described herein are realized with a product that also is resistant to being absorbed into the gum itself.

What is claimed is:

1. A method for decreasing the adhesivity of chewing gum comprising applying to the surface of the chewing gum a powder comprising an inert inorganic particulate material that is coated with edible wax.

2. A method according to claim 1 wherein the amount of said powder is 0.1 wt. % to 5 wt. % based on the weight of the gum.

3. A method according to claim 1 wherein the amount of said powder is 1 wt. % to 3 wt. % based on the weight of the gum.

4. A method according to claim 1 wherein said wax constitutes 0.05 wt. % to 5 wt. % of said powder.

5. A method according to claim 1 wherein said wax constitutes 1 wt. % to 3 wt. % of said powder.

6. A method according to claim 1 wherein said inert inorganic particulate material is talc or calcium carbonate.

7. A method according to claim 1 wherein said wax is carnauba wax.

8. A method according to claim 7 wherein said inert inorganic particulate material is talc.

9. A method according to claim 7 wherein said inert inorganic particulate material is calcium carbonate.

10. A method according to claim 1 wherein said wax contains an additive selected from flavorants, sweeteners, and colorants.

11. A method for retarding the absorption of atmospheric humidity by chewing gum, and retarding the loss of moisture by chewing gum to the atmosphere, comprising applying to the surface of the chewing gum a powder comprising inert inorganic particulate material that is coated with edible wax.

12. A method according to claim 11 wherein the amount of said powder is 0.1 wt. % to 5 wt. % based on the weight of the gum.

13. A method according to claim 11 wherein the amount of said powder is 1 wt. % to 3 wt. % based on the weight of the gum.

14. A method according to claim 11 wherein said wax constitutes 0.05 wt. % to 5 wt. % of said powder.

15. A method according to claim 11 wherein said wax constitutes 1 wt. % to 3 wt. % of said powder.

16. A method according to claim 11 wherein said inert inorganic particulate material is talc or calcium carbonate.

17. A method according to claim 11 wherein said wax is carnauba wax.

18. A method according to claim 17 wherein said inert inorganic particulate material is talc.

19. A method according to claim 17 wherein said inert inorganic particulate material is calcium carbonate.

20. A method according to claim 11 wherein said wax contains an additive selected from flavorants, sweeteners, and colorants.

\* \* \* \* \*